May 28, 1940.  R. ANDERLE  2,201,975
STEREOCAMERA
Filed May 4, 1939
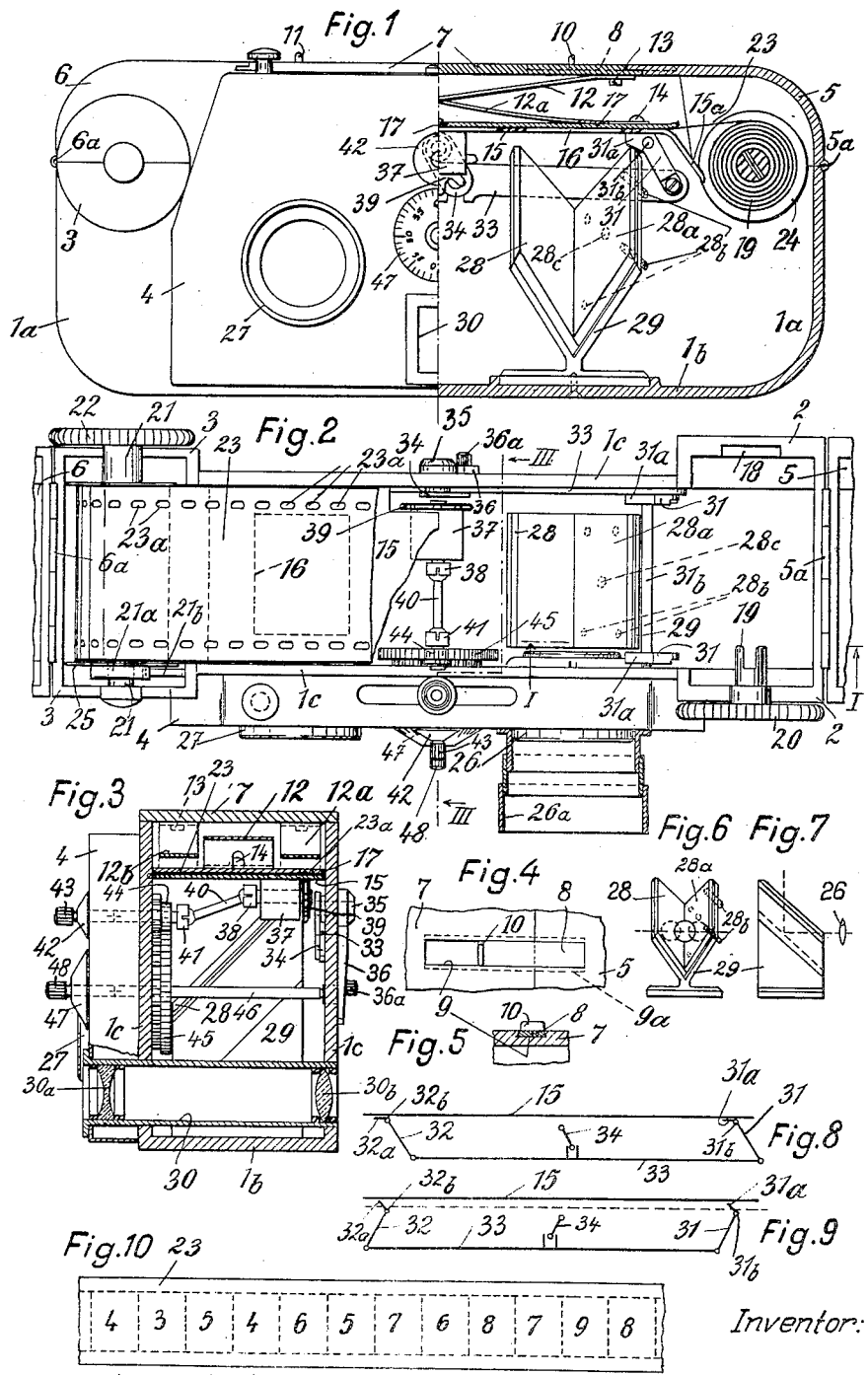
Inventor:
Robert Anderle Patented May 28, 1940

2,201,975

UNITED STATES PATENT OFFICE 2,201,975

STEREOCAMERA

Robert Anderle, Berlin-Tempelhof, Germany

Application May 4, 1939, Serial No. 271,709
In Germany April 8, 1938

26 Claims. (Cl. 95—18)

This invention relates to a photographic camera for taking stereoscopic pictures by means of strip-shaped photographic material, more particularly cinematographic film strips.

It is an object of the present invention to provide a stereoscopic camera which is small, compact, light, and inexpensive.

Another object is to provide a stereoscopic camera which is simple in operation and permits the taking of stereoscopic pictures of a high degree of perfection by the amateur, without special skill.

Still another object of the invention is to provide means in the camera for producing photographic stereoscopic pictures on photographic strips in such a manner that the associated pictures have the correct distance and position on the strip for stereoscopic reproduction and can be viewed directly, projected or printed.

With these and other objects in view, as may become apparent from the within disclosures, the invention consists not only in the structures herein pointed out and illustrated by the drawing, but includes further structures coming within the scope of what hereinafter may be claimed.

The character of the invention, however, may be best understood by reference to certain of its structural forms, as illustrated by the accompanying drawing in which—

Fig. 1 is a front view, partly in section on line I—I of Fig. 2, of a camera having the invention applied thereto.

Fig. 2 is a plan view of the camera with open cover and with the film, one of the film spools and the film platform removed on the right hand side, the side parts of the cover of the casing being shown broken away.

Fig. 3 is a partial cross section through the camera casing on line III—III of Fig. 2; the front part of the casing in which the objective lenses are positioned, is partly shown in a side view.

Figs. 4 and 5 are details showing a part of the cover of the casing including a locking arrangement for the same.

Figs. 6 and 7 are front and side views of a deflecting mirror on a support, on a reduced scale.

Figs. 8 and 9 are diagrammatic representations of the adjustable film guiding platform and the lever arrangement therefor, in a lower and in an upper adjusted position, respectively.

Fig. 10 is a diagram showing on a reduced scale a piece of film and indicating the position of the images which are associated for the stereoscopic exposures.

Similar reference numerals denote similar parts in the different views.

Referring now to the drawing in greater detail, it will be seen that the casing of the camera comprises two side walls $1a$, a bottom $1b$, front and rear walls $1c$; lateral projections 2 and 3 are provided for the reception of the end portions of the film bobbins, and the front side of the casing is formed with a projection 4 for the purpose which will be described. The casing is moreover provided with a cover consisting of two lateral parts 5 and 6 hinged to the casing at $5a$ and $6a$, respectively, to register with the projections 2 and 3 of the casing, respectively, and with a separately detachable middle part 7 which can be light-tightly connected with the parts 5 and 6 by a slide arrangement as shown best in the Figs. 4 and 5, comprising a bolt 8 received in dovetail slots 9 and $9a$ of the middle and side parts and having projections 10 and 11 for operation by hand.

Secured to the inner wall of the part 7, by means of screws 13, is a plate spring comprising portions 12, $12a$ and $12b$ for depressing the film 23 on the exposure gates of the platform 15, $15a$, 16, by means of a downholding and guiding bar 17, Figs. 1 and 3, which is secured to the lower portions of the spring at 14.

The film spool or roll 24 shown in Fig. 1 on the right and omitted in Fig. 2 is supported at one end by an axial projection in a recess 18 of the projection 2 of the casing and on the other end is engaged over an inner stud 19 of the film feeding knob 20. It will be seen that when the cover is opened, the adjustable platform and exposure gate 15, 16 is freely accessible and permits easy interchange of the film bobbins and easy introduction of the film 23 which is guided practically without buckling. The supporting shaft 21 and the driving knob 22 of the film bobbin 25 in the part 3 of the casing are shown in Fig. 2, partly covered by the film 23. A pawl and ratched wheel arrangement $21a$, $21b$ indicated in Fig. 2 on the left serves to produce at intervals a resilient mechanical resistance against further rotation of the bobbin so as to mark each step of the film feeding movement for producing on the film strip 23 a series of stereoscopically interrelated pairs of photographic pictures. To this end, the pawl $21b$ engages resiliently a corresponding recess in the ratchet wheel $21a$ with each feeding step.

In the embodiment shown in the drawing the stationary optical means of the camera comprise a pair of objective lens systems 26, 27 in the front projection 4 of the casing the optical axes of which are advantageously parallelly spaced apart by the distance between the human eyes and angular deflecting mirrors mounted on supports 29 secured to the bottom wall $1b$ of the casing and inclined at an angle of about 45° with respect to the optical axis of the associated objective system. Each mirror has two plane mirror surfaces 28, $28a$ inclined at right angles to each other and arranged symmetrically to the associated image gate 16 of the adjustable image platform 15 for the film strip 23 which is stretched thereover, as shown in Figs. 1 to 3, 6 and 7.

As indicated in Figs. 1, 2 and 6, one of the two partial mirrors 28, 28a of the two angular reversing mirrors, i. e the mirror 28a, is adjustable within small limits on its base formed by the support 29, by set screws 28b, 28c, threaded in the support 29 and rotatably secured to the mirror surface, or vice versa, so as to be in its correct position with respect to the opposite mirror 28. In this manner, the adjustment of the mirror is greatly facilitated, undesirable distortions of the image due to its reflection by the angular mirrors can be easily removed and the difficulty in producing an angle mirror with accurately inclined mirror surfaces is avoided.

The small circle 26' shown in Fig. 6 in full lines indicates the position of the projection of the optical system 26 on the mirror in case of a symmetrical or co-axial position of the optical system, the mirror and the image gate 16 in which the axis of the optical system cuts the vertex of the angle formed by the mirror surfaces 28, 28a which are symmetrical with respect to the image gate 16. In order to render possible such symmetrical arrangement, the optical axes of the two optical systems must be spaced by a multiple of one picture length on the film, or, where the optical axes are spaced apart by the distance between the eyes, the pictures must have a corresponding size whereby the image size would be determined.

Now, I have found that the mirrors 28 and image gates 16 may be laterally displaced by a certain amount with respect to the axes of the associated optical system without any detrimental effect to the images thus obtained. For example, the optical axes may be inwardly or outwardly displaced with respect to the mirror in a manner as indicated by the dotted line circles in Fig. 6. Thus, a certain degree of latitude is obtained regarding the relation of the objective distance and the picture size.

Screening members may be provided to protect the reversing mirrors against action of any undesirable reflected light. For example, a telescopic tubular screen 26a as shown in Fig. 2 in an axial section may be provided for this purpose.

The platform 15, 15a, 16, Figs. 1, 2, 3, is guided between the walls 1c of the casing and supported by a rod and lever mechanism 31, 32, 33, as best seen in Figs. 8 and 9. The said lever mechanism is pivoted in the casing at 31b and 32b and can be swung by means of a lever 34 mounted on a shaft 35 which is supported in the casing and operated by a coaxial setting lever 36, 36a on the outer wall of the casing, Figs. 1, 2, 3, through a rod 39 pivoted to the lower ends of the levers 31, 32, which by their opposite arms 31a, 32a act to raise or lower the image platform in the desired manner.

A bearing bracket 37 is fixedly connected to the underside of the adjustable platform 15, 16, and a shaft 38 supported by this bearing bracket carries a sprocket wheel 39 engaging the marginal perforations 23a of the film 23 that is stretched over the platform 15, 16, Figs. 2 and 3. Through a shaft or rod 40 and universal joints at its ends, the gear 39 which partakes in the raising and lowering movement of the platform 15, 16 is coupled with a counter or totalizer comprising shafts 41 and 46 mounted for rotation in the wall 1c of the casing and carrying intermeshing gears 44 and 45 and dials 42 and 47 for indicating the position of the film in the camera and the number of pictures already taken. Such counters are known in the art and, therefore, need not be described in detail. Knurled knobs 43 and 48 on the front ends of the shafts 41 and 46 serve to adjust the counter as desired.

As will be seen from Fig. 2, left hand half, each image frame the size of which is defined by the width of the image window 16 in the image platform comprises four consecutive marginal perforations 23a of the film strip which drive the sprocket wheel 39 and the parts 40 to 48 cooperating therewith. As shown in Fig. 10 the associated pairs of images, for example, 4, 4 or 5, 5 etc., are advantageously spaced apart by three image widths on the film strip which distance has been found advantageous for the exposure, viewing, projection, etc., of the correctly produced stereoscopic pictures.

Especially, it is possible with this arrangement by feeding the film through two image frames with each feeding step, to utilize the film strip fully and to present two fresh image frames to the exposure systems with each feeding step, without superimposition of images or free spaces left on the film. This, of course, affords an important simplification of the apparatus and economy in space and film material. Moreover, the reproduction of the film in a projection or viewing apparatus is also substantially facilitated in this manner. Of course, where it is intended to reproduce directly the film that has been exposed in the camera, it is required to use a film of the type permitting the production of opaque or dark spots on the non-exposed or less-exposed portions of the film and of transparent or bright spots on the fully or more exposed portion of the film by a special photographic process such films being known in the art and sometimes referred to as "reversing films." The size of the film is advantageously ordinary cinematographic film with the standard marginal perforations.

It will be understood that an arrangement similar to that above described with reference to the right hand half of the camera, Figs. 1 and 2, is provided symmetrically on the left hand half thereof, with the exception of the fact that one of the film rolls in the troughs 2 and 3 carries the non-exposed or raw film while the other one carries the exposed film, thus making up a double or stereoscopic camera.

It will thus be understood that the two bundles of light rays entering through the two objective lens systems 26 and 27 are deflected by the angular mirrors 28 at right angles to their original directions, towards the image windows 16. The position of the film directly underneath the top wall of the camera, at right angles to the optical axes of the camera, affords a very compact design and easy accessibility of the parts.

Moreover, due to angular shape of the mirrors, the image is reversed or turned as to its sides so that it is reproduced on the photographic strip with the correct position of its sides which is very important in order to render it possible to reproduce or view the associated images 4—4, 5—5, etc., in their positions as they are produced on the film strip, without cutting out the images and turning them round.

The arrangement of the platform 15 for adjustment by the rod and lever system 31, 32, 33, 34 permits focussing of the film in a simple manner, by the lever 36, 36a, and, more particularly ensures uniform sharpness of both pictures taken simultaneously, without any complicated mechanism acting upon the optical lens systems.

As best seen in Figs. 2 and 3, the inner walls of the casing are made to engage the edges of the film, whereby the same is reliably guided in a lateral direction without any additional guiding means. This guiding action of the walls of the casing is rendered possible by the provision of the projections 2 and 3 for reception of the ends of the film spools extending beyond the width of the film.

The said arrangement of the optical system permits at the same time the convenient and compact arrangement of a view finder 30 for direct viewing near the bottom of the camera between the stationary exposure means. The lenses 30a and 30b of the view finder are thus mechanically protected. Moreover, there is no space required for the finder outside the camera and the camera can be easily operated in the focussing operation. If desired, the finder 30 may be in the form of a combined finder and distance meter as known to those skilled in the art.

It will be clear that the optical exposure systems 26, 27 apart from the objective lenses comprise the requisite ganged diaphragm and shutter means as known in the art for the simultaneous exposure of the two film portions above the two image gates 16.

It is within the purview of this invention to use accurately ground prisms, preferably having suitable mirror surfaces, instead of the composite angular mirrors 28, 28a, although the angle mirrors above referred to are generally preferred because they are less expensive to make, lighter in weight, easy to adjust and do not produce any undesirable auxiliary images.

I am aware that many further changes may be made and numerous details of constructions may be varied through a wide range without departing from the principles of this invention, and I, therefore, do not purpose limiting the patent granted hereon otherwise than is necessitated by the claims.

I claim—

1. In a stereocamera, a camera casing, a pair of parallelly spaced optical exposure systems, means for supplying an unexposed photographic strip, means for receiving the exposed portions of said photographic strip, means for guiding the said strip in a plane substantially parallelly spaced from the connecting plane between the axes of said optical exposure systems, and means by which the bundles of light rays entering through said optical exposure systems are deflected towards said photographic strip.

2. In a stereocamera, a camera casing, a pair of parallelly spaced optical exposure systems, means for supplying an unexposed photographic strip, means for receiving the exposed portions of said photographic strip, means for guiding said strip in a plane substantially parallelly spaced from the connecting plane between the axes of said optical exposure systems, means for conveying said strip from the supplying means to the receiving means, said conveying means including operating means outside said casing, and means by which the bundles of light rays entering through said optical exposure systems are deflected towards said photographic strip.

3. In a stereocamera, a camera casing, a pair of parallelly spaced optical exposure systems, means for supplying an unexposed photographic strip, means for receiving the exposed portions of said photographic strip, means comprising an image gate associated to each of said optical exposure systems for guiding said strip in a plane substantially parallelly spaced from the connecting plane between the axes of said optical exposure systems, and means for deflecting the bundles of light rays entering through said optical exposure systems towards said photographic strip.

4. In a stereocamera, a camera casing, a pair of parallelly spaced optical exposure systems, means for supplying an unexposed photographic strip, means for receiving the exposed portions of said photographic strip, means for guiding said strip in a plane substantially parallelly spaced from the connecting plane between the axes of said optical exposure systems, and means for deflecting the bundles of light rays entering through said optical exposure systems towards said photographic strip and for inverting the images projected on said photographic strip in a manner to have the sides of the two associated images correctly positioned on the strip.

5. In a stereocamera, a camera casing, a pair of parallelly spaced optical exposure systems, means for supplying an unexposed photographic strip, means for receiving the exposed portions of said photographic strip, means for guiding said strip in a plane substantially parallelly spaced from the connecting plane between the axes of said optical exposure systems, and mirror means for deflecting the bundles of light rays entering through said optical exposure systems towards said photographic strip and for inverting the images projected on said photographic strip in a manner to have the sides of the two associated images correctly positioned on the strip.

6. In a stereocamera, a camera casing, a pair of parallelly spaced optical exposure systems, means for supplying an unexposed photographic strip, means for receiving the exposed portions of said photographic strip, means for guiding said strip in a plane substantially parallelly spaced from the connecting plane between the axes of said optical exposure systems, and a pair of mirrors inclined at substantially 45° with respect to said axes for deflecting the bundles of light rays entering through said optical exposure systems towards said photographic strip.

7. In a stereocamera, a camera casing, a pair of parallelly spaced optical exposure systems, means for supplying an unexposed photographic strip, means for receiving the exposed portions of said photographic strip, means for guiding said strip in a plane substantially parallelly spaced from the connecting plane between the axes of said optical exposure systems, and a pair of mirrors comprising each two mirror surfaces forming together an angle of 90°, with the vertex line between the surfaces inclined with respect to said optical axes, for deflecting the bundles of light rays entering through said optical exposure systems towards said photographic strip, and for inverting the images projected on said photographic strip in a manner to have the sides of the two associated images correctly positioned on the strip.

8. In a stereocamera, a camera casing, a pair of parallelly spaced optical exposure systems, means for supplying an unexposed photographic strip, means for receiving the exposed portions of said photographic strip, means comprising a platform for guiding said strip in a plane substantially parallelly spaced from the connecting plane between the axes of said optical exposure systems, and means for deflecting the bundles of light rays entering through said optical exposure systems towards said photographic strip.

9. In a stereocamera, a camera casing, a pair of parallelly spaced optical exposure systems, means for supplying an unexposed photographic strip, means for receiving the exposed portions of said photographic strip, means for guiding said strip in a plane substantially parallelly spaced from the connecting plane between the axes of said optical exposure systems, and a pair of mirrors comprising each two mirror surfaces forming together an angle of 90°, with the vertex line between the surfaces inclined with respect to said optical axes, and mechanical means for accurately adjusting at least one mirror surface of each mirror, for deflecting the bundles of light rays entering through said optical exposure systems towards said photographic strip, and for inverting the images projected on said photographic strip in a manner to have the sides of the two associated images correctly positioned on the strip.

10. In a stereocamera, a camera casing, a pair of parallelly spaced optical exposure systems, means for supplying an unexposed, perforated photographic film strip, means for receiving the exposed portions of said photographic strip, means for guiding said strip in a plane substantially parallelly spaced from the connecting plane between the axes of said optical exposure systems, a counter device comprising a sprocket wheel engaging said perforations and indicating means outside said casing operatively connected with said sprocket wheel, and means for deflecting the bundles of light rays entering through said optical exposure systems towards said photographic strip.

11. In a stereocamera, a camera casing, a pair of parallelly spaced optical exposure systems, means for supplying an unexposed, perforated photographic film strip, means for receiving the exposed portions of said photographic strip, means for receiving the exposed portions of said photographic strip, means for guiding said strip in a plane substantially parallelly spaced from the connecting plane between the axes of said optical exposure systems, means comprising a sprocket wheel engaging said perforations for conveying said film strip from said supplying means to said receiving means and operating and indicating means therefor outside said casing for enabling the operator to feed the film by two image lengths with each feeding step, and means for deflecting the bundles of light rays entering through said optical exposure systems toward said photographic strip.

12. In a stereocamera, a camera casing, a pair of optical exposure systems parallelly spaced with their axes at interocular distance, means for supplying an unexposed photographic strip, means for receiving the exposed portions of said photographic strip, means for guiding said strip in a plane substantially parallelly spaced from the connecting plane between the axes of said optical exposure systems, and means for deflecting the bundles of light rays entering through said optical exposure systems towards said photographic strip.

13. In a stereocamera, a camera casing, a pair of optical exposure systems parallelly spaced with their axes at a distance of the order of three image lengths, means for supplying an unexposed photographic strip, means for receiving the exposed portions of said photographic strip, means for guiding said strip in a plane substantially parallelly spaced from the connecting plane between the axes of said optical exposure systems, and means for deflecting the bundles of light rays entering through said optical exposure systems towards said photographic strip.

14. In a stereocamera, a camera casing, a pair of optical exposure systems parallelly spaced with their axes at a distance of the order of three image lengths, means for supplying an unexposed standard size cinematographic film strip, means for receiving the exposure portions of said photographic strip, means for guiding said strip in a plane substantially parallelly spaced from the connecting plane between the axes of said optical exposure ssytems, and means for deflecting the bundles of light rays entering through said optical exposure systems towards said photographic strip.

15. In a stereocamera, a camera casing, a pair of optical exposure systems parallelly spaced with their axes at a distance of the order of three image lengths, a roll for supplying an unexposed, perforated photographic film strip, a roll for winding up the exposed portions of said photographic strip, means for guiding said strip, means comprising a sprocket wheel engaging said perforations and indicating means outside said casing and operatively connected with said sprocket wheel, for enabling the operator to feed the film by two image lengths with each feeding step, by operation of said rolls.

16. In a stereocamera, a camera casing, a pair of parallelly spaced optical exposure systems, means for supplying an unexposed photographic strip, means for receiving the exposed portions of said photographic strip, means comprising an image gate associated to each of said optical exposure systems for guiding said strip in a plane substantially parallelly spaced from the connecting plane between the axes of said optical exposure systems, and a pair of mirrors comprising each two mirror surfaces forming together an angle of 90° with the vertex line between the mirror surfaces which are arranged symmetrical to the associated image gate and inclined with respect to said optical axes, whereby the bundles of light rays entering through said optical exposure systems are deflected towards said photographic strip, and the images projected on said photographic strip are inverted in a manner to have the sides of the two associated images correctly positioned on the strip.

17. In a stereocamera, a camera casing, a pair of parallelly spaced optical exposure systems, means for supplying an unexposed photographic strip, means for receiving the exposed portions of said photographic strip, means comprising an image gate associated to each of said optical exposure systems, for guiding said strip in a plane substantially parallel'y spaced from the connecting plane between the axes of said optical exposure systems, and a pair of mirrors comprising each two mirror surfaces forming together an angle of 90° with the vertex line between the surfaces arranged symmetrical to the associated image gate, but non-symmetrical to the associated optical system and inclined with respect to said optical axes, for deflecting the bundles of light rays entering through said optical exposure systems towards said photographic strip, and for inverting the images projected on said photographic strip in a manner to have the sides of the two associated images correctly positioned on the strip.

18. In a stereocamera, a camera casing, a pair of parallelly spaced optical exposure systems, means for supplying an unexposed photographic strip, means for receiving the exposed portions of said photographic strip, means comprising an apertured strip-guiding platform parallelly spaced from the connecting plane between the optical axes of said optical exposure system and means for focussing the strip portions in the apertures of said platform, and means for deflecting the bundles of light rays entering through said optical exposure systems towards said photographic strip.

19. In a stereocamera, a camera casing, a pair of parallelly spaced optical exposure systems, means for supplying an unexposed photographic strip, means for receiving the exposed portions of said photographic strip, means comprising an apertured strip guiding platform parallelly spaced from the connecting plane between the optical axes of said optical exposure system and means including a lever mechanism and operating members outside said casing for focussing the strip portions in the apertures of said platform, and means for deflecting the bundles of light rays entering through said optical exposure systems towards said photographic strip.

20. In a stereocamera, a camera casing, a pair of parallelly spaced optical exposure systems, means for supplying an unexposed photographic strip, means for receiving the exposed portions of said photographic strip, means for guiding said strip in a plane substantially parallelly spaced from the connecting plane between the axes of said optical exposure systems, means for conveying said strip from said supply means to said receiving means, the strip being laterally guided by edgewise engagement with the walls of said casing, and means for deflecting the bundles of light rays entering through said optical exposure systems towards said photographic strip.

21. In a photographic camera for taking stereoscopic pictures, a camera casing, a pair of parallelly spaced optical exposure systems, a roll for supplying unexposed photographic film, a roll for winding up the exposed portions of said photographic film, means for guiding the film by engagement with the walls of the casing and in a plane substantially parallelly spaced from the connecting plane between the axes of said optical exposure systems, and means for deflecting the bundles of light rays entering through said optical exposure systems towards said film, said casing having projections for the reception of the end portions of said rolls which extend beyond said film-engaging walls of the casing.

22. In a photographic camera for taking stereoscopic pictures, a camera casing, a pair of parallelly spaced optical exposure systems, a roll for supplying unexposed photographic film, a roll for winding up the exposed portions of said photographic film, means for guiding the film in a plane substantially parallelly spaced from the connecting plane between the axes of said optical exposure systems, means for deflecting the bundles of light rays entering through said optical exposure systems towards said film, and a viewfinder for direct viewing arranged intermediate said optical exposure systems and near the bottom of said casing.

23. In a photographic camera for taking stereoscopic pictures, a camera casing, a pair of parallelly spaced optical exposure systems, a roll for supplying unexposed cinematographic film, a roll for winding up the exposed portions of said photographic film, means comprising an apertured film guiding platform parallelly spaced from the connecting plane between the optical axes of said optical exposure system, means for adjusting the spacing of the platform from said connecting plane, a sprocket rotatably mounted on said movable platform for engagement with the perforations of the film, a stationarily mounted counter device including dial and setting means outside said casing and means for transferring rotary movements from said sprocket to said counter irrespective of adjusting movements of said platform, and means for deflecting the bundles of light rays entering through said optical exposure systems towards said film.

24. In a photographic camera for taking stereoscopic pictures, a camera casing, a pair of parallelly spaced optical exposure systems, a roll for supplying unexposed photographic film, a roll for winding up the exposed portions of said photographic film, means for guiding the film in a plane substantially parallelly spaced from the connecting plane between the axes of said optical exposure systems, means for deflecting the bundles of light rays entering through said optical exposure systems towards said film, and a cover provided on the side of said casing where said rolls are arranged and comprising two hingedly mounted side parts for rendering the film rolls accessible and a detachable middle part for rendering said platform accessible and for locking said side parts in the closed position of the cover.

25. In a photographic camera for taking stereoscopic pictures, a camera casing, a pair of parallelly spaced optical exposure systems, a roll for supplying unexposed cinematographic film, a roll for winding up the exposed portions of said photographic film, means comprising an apertured film guiding platform parallelly spaced from the connecting plane between the optical axes of said optical exposure system, means for adjusting the spacing of the platform from said connecting plane, means for deflecting the bundles of light rays entering through said optical exposure systems towards said film, and a cover provided on the side of said casing where said rolls are arranged and comprising two hingedly mounted side parts for rendering the film rolls accessible and a detachable middle part for rendering said platform accessible and for locking said side parts in the closed position of the cover, a plate for holding the film engaged with said platform in any adjusted position of the same and resilient means between said middle part and said plate for depressing said plate and the film.

26. In a photographic camera for taking stereoscopic pictures, a camera casing, a pair of parallelly spaced optical exposure systems including screening members for protecting the camera from undesirable light rays acting upon said systems, a roll for supplying unexposed photographic film, a roll for winding up the exposed portions of said photographic film, means for guiding the film in a plane substantially parallelly spaced from the connecting plane between the axes of said optical exposure systems, and means for deflecting the bundles of light rays entering through said optical exposure systems towards said film.

ROBERT ANDERLE.